(12) United States Patent
Kaesgen et al.

(10) Patent No.: US 9,815,494 B2
(45) Date of Patent: Nov. 14, 2017

(54) VEHICLE DRIVE CONTROL SYSTEMS

(71) Applicant: MTD Products Inc, Valley City, OH (US)

(72) Inventors: Derek Kaesgen, Valley City, OH (US); Paul Crawford, Valley City, OH (US); David M. Kelly, Valley City, OH (US)

(73) Assignee: MTD Products Inc, Valley City, OH (US)

( * ) Notice: Subject to any disclaimer, the term of this patent is extended or adjusted under 35 U.S.C. 154(b) by 139 days.

(21) Appl. No.: 14/649,717

(22) PCT Filed: Dec. 4, 2013

(86) PCT No.: PCT/US2013/073014
§ 371 (c)(1),
(2) Date: Jun. 4, 2015

(87) PCT Pub. No.: WO2014/089157
PCT Pub. Date: Jun. 12, 2014

(65) Prior Publication Data
US 2015/0298737 A1    Oct. 22, 2015

Related U.S. Application Data

(60) Provisional application No. 61/733,322, filed on Dec. 4, 2012.

(51) Int. Cl.
*F16H 48/20* (2012.01)
*B62D 11/10* (2006.01)
(Continued)

(52) U.S. Cl.
CPC ............... *B62D 11/10* (2013.01); *B60K 1/00* (2013.01); *B60K 7/0007* (2013.01); *B60K 17/02* (2013.01);
(Continued)

(58) Field of Classification Search
CPC ......... B62D 11/20; B62D 11/14; B62D 11/06; B62D 11/24; F16H 48/20; F16H 48/06;
(Continued)

(56) References Cited

U.S. PATENT DOCUMENTS 4,702,358 A * 10/1987 Mueller ................ B62D 11/08
    180/6.7
4,882,947 A   11/1989 Barnard ......................... 475/23
(Continued)

FOREIGN PATENT DOCUMENTS

CN      101511662     8/2009
JP      01-160783     6/1989
(Continued)

OTHER PUBLICATIONS

International Search Report and Written Opinion issued in PCT/US2013/073014, dated Mar. 26, 2014.
(Continued)

*Primary Examiner* — David J Hlavka
(74) *Attorney, Agent, or Firm* — Norton Rose Fulbright US LLP

(57) ABSTRACT

Vehicle drive control systems, such as those, for example, configured to permit a vehicle to direct power to at least one drivable element (such as, for example, via a drive shaft, a supplemental drive, or a battery) to assist the vehicle in making a low-radius turn.

20 Claims, 15 Drawing Sheets

(51) Int. Cl.
*B60W 30/02* (2012.01)
*B60W 30/045* (2012.01)
*B62D 11/08* (2006.01)
*B62D 11/24* (2006.01)
*B60K 1/00* (2006.01)
*B60K 7/00* (2006.01)
*B60K 17/02* (2006.01)
*B60K 17/08* (2006.01)
*B60K 17/16* (2006.01)
*B62D 11/14* (2006.01)
*F16H 48/06* (2006.01)
*F16H 48/36* (2012.01)
*B60K 20/00* (2006.01)

(52) U.S. Cl.
CPC .......... *B60K 17/08* (2013.01); *B60K 17/165* (2013.01); *B60W 30/02* (2013.01); *B60W 30/045* (2013.01); *B62D 11/08* (2013.01); *B62D 11/14* (2013.01); *B62D 11/24* (2013.01); *F16H 48/06* (2013.01); *F16H 48/20* (2013.01); *F16H 48/36* (2013.01); *B60K 20/00* (2013.01); *B60K 2001/001* (2013.01); *B60K 2007/0061* (2013.01)

(58) Field of Classification Search
CPC ......... F16H 48/36; B60K 17/165; B60K 1/00; B60K 7/0007; B60K 17/02; B60K 17/08; B60K 2007/0061; B60K 2001/001; B60K 20/00; B60W 30/045; B60W 30/02
See application file for complete search history.

(56) References Cited

U.S. PATENT DOCUMENTS

| | | | | |
|---|---|---|---|---|
| 5,857,532 A * | 1/1999 | Satzler | ................ | B62D 11/183 180/6.2 |
| 5,921,335 A * | 7/1999 | Straetker | ............. | B62D 11/183 180/6.44 |
| 5,948,029 A * | 9/1999 | Straetker | ............. | B62D 11/183 180/6.44 |
| 5,975,224 A * | 11/1999 | Satzler | .................... | B62D 9/00 180/6.3 |
| 6,039,132 A * | 3/2000 | Easton | ................ | B62D 11/183 180/6.44 |
| 6,170,584 B1 * | 1/2001 | Mistry | ................ | B62D 11/183 180/421 |
| 6,208,922 B1 * | 3/2001 | Easton | ................ | B62D 11/183 180/6.44 |
| 7,597,160 B2 | 10/2009 | Lawson, Jr. | ................ | 180/6.48 |
| 7,648,002 B2 * | 1/2010 | Easton | ................ | B62D 11/183 180/408 |
| 7,942,220 B2 | 5/2011 | Dabbs et al. | ................ | 180/6.48 |
| 2007/0144797 A1 | 6/2007 | Tarasinski et al. | .......... | 180/6.28 |
| 2012/0285765 A1 * | 11/2012 | Zulu | ..................... | B62D 11/18 180/431 |

FOREIGN PATENT DOCUMENTS

JP     H06-293226     10/1994
KR     10-0312914     12/2001

OTHER PUBLICATIONS

International Preliminary Report on Patentability issued in PCT/US2013/073014, dated Jun. 18, 2015.
Extended European Search Report issued in Application No. 13860893, dated Feb. 27, 2017.
Search Report (and translation thereof) issued in Chinese Application No. 201380071909, dated Mar. 13, 2017.

* cited by examiner

VEHICLE DRIVE CONTROL SYSTEMS

CROSS-REFERENCE TO RELATED APPLICATIONS

This application is a national phase application under 35 U.S.C. 371 of International Application No. PCT/US2013/073014, filed on Dec. 4, 2013, which claims the benefit of priority of U.S. Provisional Patent Application No. 61/733,322, filed on Dec. 4, 2012. The entire contents of each of the above-referenced applications are specifically incorporated herein by reference without disclaimer.

DESCRIPTION

Background

Field of the Invention

The present invention relates generally to vehicle drive control systems and, more particularly, but not by way of limitation, to vehicle drive control systems for directing power to at least one (e.g., one, two, or more) drivable element, such as a wheel. Such a system may be used with a vehicle, such as a city car, to allow for the execution of a low-radius (e.g., a zero-radius) turn, thus enhancing its maneuverability.

SUMMARY

This disclosure includes embodiments of vehicle drive control systems that can be used, for example, to configure a vehicle (e.g., an automobile) to make low- to zero-radius turns. Such vehicles may enjoy increased maneuverability in tight spaces over comparable vehicles that do not include one of the present vehicle drive control systems, making them easier to parallel park, u-turn, etc. Other vehicles with which the present vehicle drive control systems may be used include those with more than four wheels, and those with only two wheels or only three wheels.

Some embodiments of the present vehicle drive control systems comprise a differential gear assembly coupled to a main drive shaft such that the main drive shaft can drive the differential gear assembly; a first half shaft and a second half shaft extending from the differential gear assembly, the first half shaft coupled to a first drivable element (e.g., a wheel) and the second half shaft coupled to a second drivable element (e.g., a wheel), the first half shaft being decouplable from the first drivable element such that the first drivable element can rotate independently of the first half shaft; and a rotation-prevention mechanism configured to prevent rotation of the first half shaft when the first half shaft is decoupled from the first drivable element such that power from the main drive shaft can be directed through the differential gear assembly to drive the second drivable element without also driving the first half shaft. The first drivable element may rotate freely (free-wheel) during execution of a low- to zero-radius turn using such a vehicle drive control system.

Some embodiments of the present vehicle drive control systems comprise a differential gear assembly coupled to a main drive shaft such that the main drive shaft can drive the differential gear assembly; a first half shaft and a second half shaft extending from the differential gear assembly, the first half shaft coupled to a first drivable element (e.g., a wheel) and the second half shaft coupled to a second drivable element (e.g., a wheel), the differential gear assembly including a ring gear rotatably coupled to the first half shaft; and a first supplemental drive unit coupled to the first half shaft. The differential gear assembly of such embodiments is lockable (e.g., through placing the main drive shaft in park, through a lock (such as a brake) on the main drive shaft, or through a mechanism connected directly to the ring gear that can prevent rotation of the ring gear, such as a locking pin or pawl) such that, when the differential gear assembly is locked, power from the first supplemental drive can drive the first drivable element in a first direction and back drive the differential gear assembly to cause the second drivable element to rotate in a second direction opposite to the first direction.

Some embodiments of the present vehicle drive control systems comprise a differential gear assembly coupled to a main drive shaft such that the main drive shaft can drive the differential gear assembly; a first half shaft and a second half shaft extending from the differential gear assembly, the first half shaft coupled to a first drivable element (e.g., a wheel) and the second half shaft coupled to a second drivable element (e.g., a wheel), the differential gear assembly including a ring gear rotatably coupled to the first half shaft; and a first supplemental drive unit coupled to the first half shaft. The differential gear assembly of such embodiments is lockable (e.g., through placing the main drive shaft in park, through a lock (such as a brake) on the main drive shaft, or through a mechanism connected directly to the ring gear that can prevent rotation of the ring gear, such as a locking pin or pawl) such that, when the differential gear assembly is locked, power from the first supplemental drive can drive the first drivable element in a first direction and back drive the differential gear assembly to cause the second drivable element to rotate in a second direction opposite to the first direction.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system or a component of a system that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

Further, a vehicle drive control system, or a component of such a system, that is configured in a certain way is configured in at least that way, but it can also be configured in other ways than those specifically described.

Any embodiment of any of the present systems can consist of or consist essentially of—rather than comprise/include/contain/have—any of the described elements and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures illustrate the described elements using graphical symbols that will be understood by those of ordinary skill in the art.

DESCRIPTION OF ILLUSTRATIVE EMBODIMENTS

The term "coupled" is defined as connected, although not necessarily directly, and not necessarily mechanically. Two things are "couplable" if they can be coupled to each other, and two things are "decouplable" if they can be decoupled from each other; unless the context explicitly requires otherwise, things are that couplable are also decouplable, and vice-versa. One non-limiting way in which a first structure is couplable to a second structure is for the first structure to be configured to be coupled to the second structure, and one non-limiting way for a first structure to be decouplable from a second structure is for the first structure to be configured to be decoupled from the second structure. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Figure 1A:
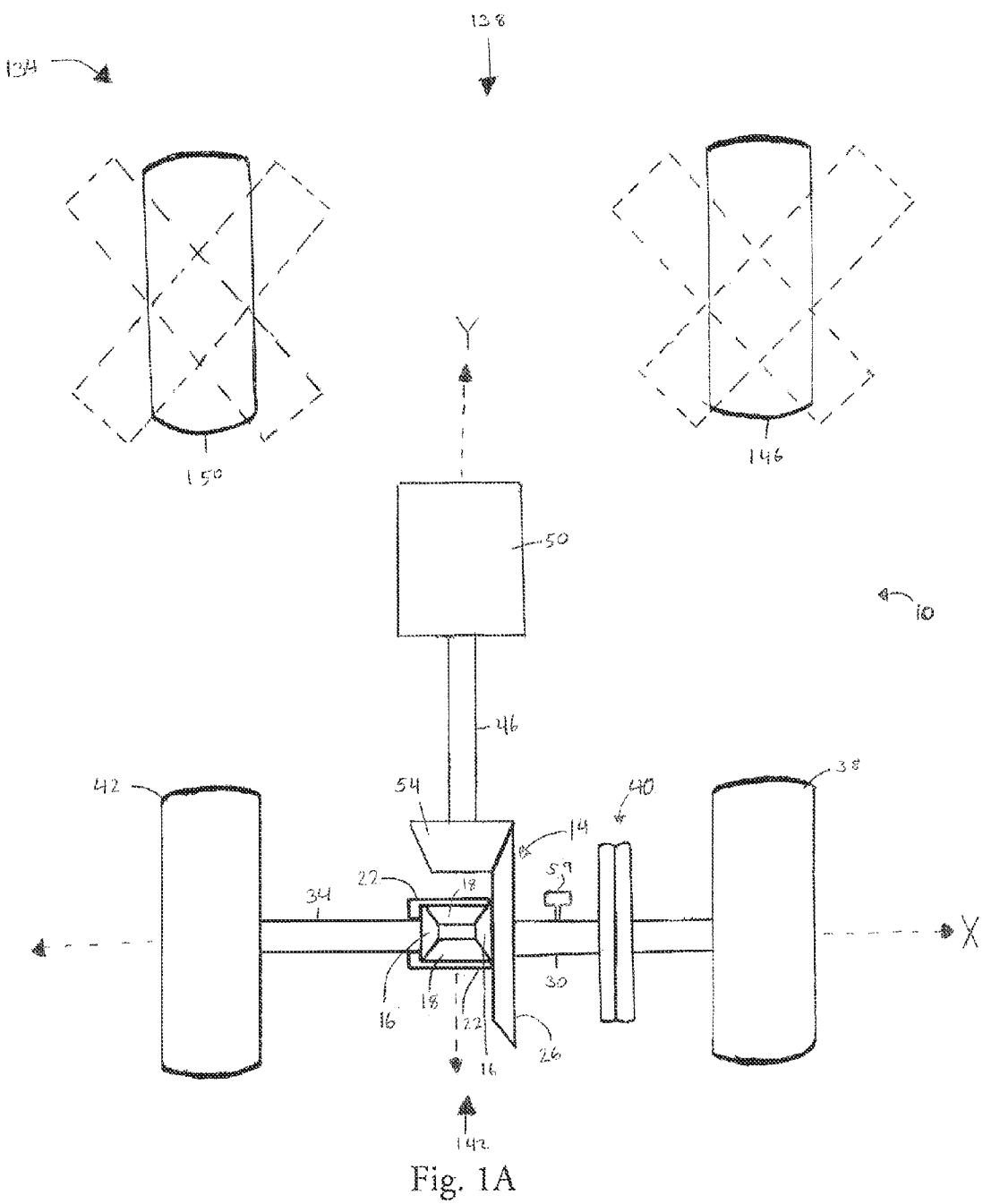
FIGS. 1A-1B depict one embodiment of the present vehicle drive control systems in the context of a drivable wheel that can be decoupled from its half shaft such that it can rotate independently of the half shaft.
Figure 1B:
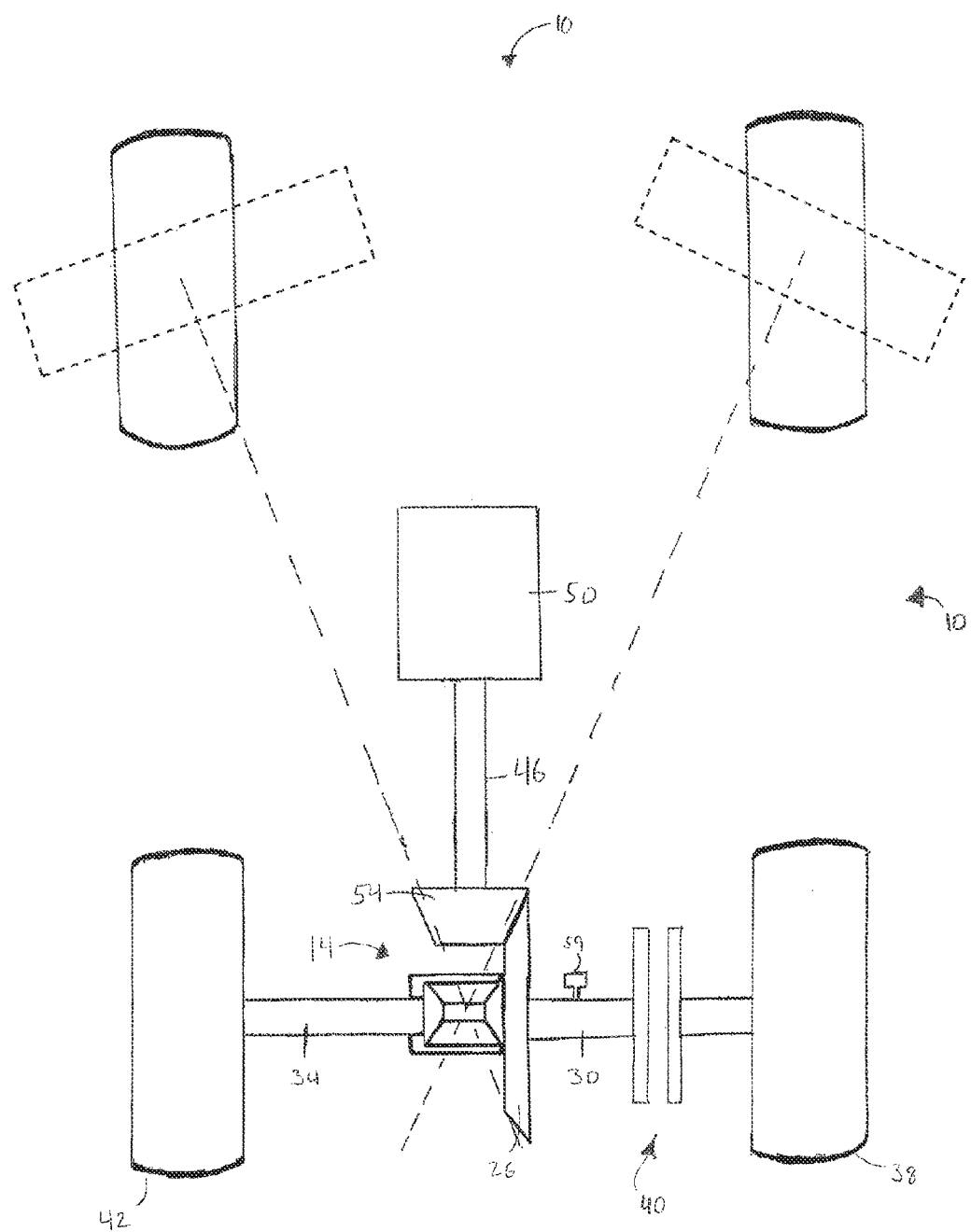

Referring now to the drawings, and more particularly to FIGS. 1A-1B, shown there and designated by the reference numeral 10 is one embodiment of the present vehicle drive control systems. The term "vehicle" includes, for example, automobiles (including those termed "city cars"), trucks (including pickups), buses, utility vehicles, etc., and further includes structures having two, three, four, or more drivable elements (e.g., wheels). In the embodiment shown, vehicle drive control system 10 comprises differential gear assembly 14, examples of which include, but are not limited to, an open differential gear assembly, a limited slip differential gear assembly (such as a clutch-type limited slip differential), locking differentials, TORSEN differentials, and the like. Differential gear assembly 14 comprises first inner gears 16 and second inner gears 18. In the context of an open differential, first inner gears 16 can be referred to as side gears and second inner gears 18 can be referred to as pinion gears.

In the embodiment shown, inner gears 16 and 18 are configured to be coupled (e.g., are coupled, in the depicted embodiment) to at least one (e.g., one, two, or more) other inner gear. Inner gears 16 are perpendicular to and coaxial with axis X, which, in this embodiment, is the axis about which inner gears 16 and the rear drive wheels rotate. Depending on the position of ring gear 26 (discussed below), inner gears 18 may be disposed perpendicular to and coaxial with axis Y, which, in this embodiment, is the axis about which inner gears 18 rotate, and are configured to move about axis X. In some embodiments, inner gears 16 and 18 may not be disposed relative to axis X and/or axis Y. Inner gears 16 and 18 may comprise various types of gears (e.g., spur, helical, spiral, beveled, etc.) and may have various sizes. In some embodiments, differential gear assembly 14 may comprise less than four inner gears 16 and 18 (e.g., three). In other embodiments, differential gear assembly 14 may comprise more than four inner gears 16 and 18 (e.g., five, six, or more).

In the embodiment shown, differential gear assembly 14 comprises one or more brackets 22, which may be referred to together as a cage. Brackets 22 are configured to be coupled (e.g., are coupled, in the depicted embodiment) to at least one of inner gears 16 and 18. Brackets 22 are also coupled to inner gears 18 and are configured to move with inner gears 18 about axis X. In other embodiments, a single unitary bracket may be used instead of two separate brackets 22. Such a bracket may also be referred to as a cage.

In the embodiment shown, brackets 22 are further configured to be coupled (e.g., are coupled, in the depicted embodiment) to ring gear 26. Ring gear 26 is perpendicular to and coaxial with axis X (e.g., the ring gear rotates about axis X), and brackets 22 rotate with ring gear 26 (e.g., in the same rotational direction) about axis X.

In the embodiment shown, differential gear assembly 14 is configured to be coupled (e.g., is coupled, in the depicted embodiment) to a first half shaft 30 and a second half shaft 34, each of which extends from the differential gear assembly. Half shafts 30 and 34 rotate about (are coaxial with) axis X, and each half shaft is configured to be coupled (e.g., is coupled, in the depicted embodiment) to one of inner gears 16. In some embodiments, half shafts 30 and 34 may be unitary with inner gears 16.

In the embodiment shown, ring gear 26 (which may be considered part of assembly 14 in some embodiments) is coupled (e.g., rotatably) to half shaft 30 such that ring gear 26 can rotate about half shaft 30 when half shaft 30 is stationary; such a coupling may be achieved in any suitable manner, such as with one or more bearings. As shown, ring gear 26 may be perpendicular to and coaxial with half shaft 30. In some embodiments, ring gear 26 may be coupled (e.g., rotatably) as described above to half shaft 34 instead of half shaft 30.

In the embodiment shown, half shaft 30 is decouplable from first drivable element (wheel, in this embodiment) 38, which is perpendicular to and coaxial with axis X. That decoupling may be achieved through mechanism 40 (which may be referred to as coupling mechanism 40), which can be a clutch or the like, as those of ordinary skill in the art will understand. For example, coupling mechanism 40 may be characterized more specifically as a clutch mechanism and could take the form, for example, of a disc clutch, a dog clutch, or a collar that slides over a toothed hub (that would otherwise freewheel).

In the embodiment shown, drivable wheel 38 can rotate with half shaft 30 (e.g., in the same rotational direction) about axis X if the two are coupled to each other. Half shaft 34 is coupled to second drivable element (wheel, in this embodiment) 42, which is perpendicular to and coaxial with axis X and which can rotate with half shaft 34 (e.g., in the same rotational direction) about axis X.

As shown in FIGS. 1A and 1B, differential gear assembly 14 is configured to be coupled to a main drive shaft 46, which is coupled to and configured to provide power from drive unit 50 to drivable wheels 38 and/or 42. In some embodiments, drive unit 50 may comprise various types of drives—such as, for example, a combustion engine, a steam engine, a reciprocating engine, a gas turbine, a hydraulic engine, an electrical engine, an electric motor, a hydraulic motor, a pneumatic actuator, a linear actuator, a piezoelectric actuator, and/or the like—and may also include, in some instances, a gearset, such as a transmission. In the embodiment shown, main drive shaft 46 can rotate about axis Y, and drive unit 50 is configured to cause that rotation. In the embodiment shown, main drive shaft 46 is coupled to pinion 54. In some embodiments, main drive shaft 46 may be unitary with pinion 54. Pinion 54 is configured to be coupled to (e.g., is coupled to, as shown) differential gear assembly 14 such that power from drive unit 50 can pass to differential gear assembly 14, e.g., through main drive shaft 46 and pinion 54. Pinion 54 is also configured to be coupled to (e.g., is coupled to, as shown) ring gear 26 such that power from drive unit 50 can pass to differential gear assembly 14, e.g., through ring gear 26. In other embodiments, power from drive unit 50 may pass to differential gear assembly 14 through any other suitable combination of shafts, pinions, gears, and/or the like.

In the embodiment shown, half shaft 30 may be coupled as shown in FIG. 1A or decoupled as shown in FIG. 1B from drivable wheel 38 by mechanism 40. In vehicle drive control system 10a shown in FIGS. 2A and 2B, half shaft 34 may also be coupled (e.g., FIG. 2A) or decoupled (e.g., FIG. 2B) from drivable wheel 42 by mechanism 56, which may be the same type of mechanism as mechanism 40. In these embodiments, mechanisms 40 and 56 may be disposed at any suitable location between differential gear assembly 14 and the respective drivable wheels.

Mechanisms 40 and 56 allow half shafts 30 and 34 to be decoupled from drivable wheels 38 and 42, respectively, such that drivable wheels 38 and 42 can rotate independently (e.g., freely) of half shafts 30 and 34. When the half shafts are coupled to the drivable wheels, neither drivable wheel can rotate independently of the half shafts to which it is coupled.

In some embodiments, half shaft 30 can be decoupled from drivable wheel 38 while half shaft 34 is coupled to drivable wheel 42 such that drivable wheel 38 can rotate independently of half shaft 30 while drivable wheel 42 can rotate with half shaft 34. In other embodiments, half shaft 34 can be decoupled from drivable wheel 42 while half shaft 30 is coupled to drivable wheel 38 such that drivable wheel 42 can rotate independently of half shaft 34 while drivable wheel 38 can rotate with half shaft 30. In other embodiments (e.g., FIG. 2B), half shafts 30 and 34 can both be decoupled from drivable wheels 38 and 42, respectively, such that both drivable wheels 38 and 42 can rotate independently of half shafts 30 and 34, respectively.

Some embodiments of the present vehicle drive control systems (as depicted in, for example, FIGS. 1A and 1B) include a rotation-prevention mechanism 59 that is configured to prevent rotation of half shaft 30 (e.g., by locking half shaft 30). Rotation-prevention mechanism 59 can more specifically be characterized as a lock 59 or a brake 59 and may comprise a brake, a lockable gearset, or the like, as someone of ordinary skill in the art will understand. If a brake is used, it could be located outside of ring gear 26—as shown schematically in FIGS. 1A and 1B—or it could be between the ring gear and the differential gear assembly. Examples of suitable brakes include drum brakes, disc brakes, and dog brakes. Rotation-prevention mechanism 59 is configured to prevent the rotation of half shaft 30 when half shaft 30 is decoupled from drivable wheel 38 such that power from main drive shaft 46 can be directed through differential gear assembly 14 to drivable wheel 42 without also driving half shaft 30. Some embodiments of the present vehicle drive control systems, such as system 10a in FIGS. 2A and 2B, also include another rotation-prevention mechanism 60 configured to prevent the rotation of half shaft 34 (e.g., by locking half shaft 34) when half shaft 34 is decoupled from drivable wheel 42 such that power from main drive shaft 46 can be directed through differential gear assembly 14 to drivable wheel 38 without also driving half shaft 34. Rotation-prevention mechanism 60 can more specifically be characterized as a lock 60 or a brake 60 and may comprise a brake, a lockable gearset, or the like, as someone of ordinary skill in the art will understand. Examples of suitable brakes include drum brakes, disc brakes, and dog brakes.

Figure 3A:
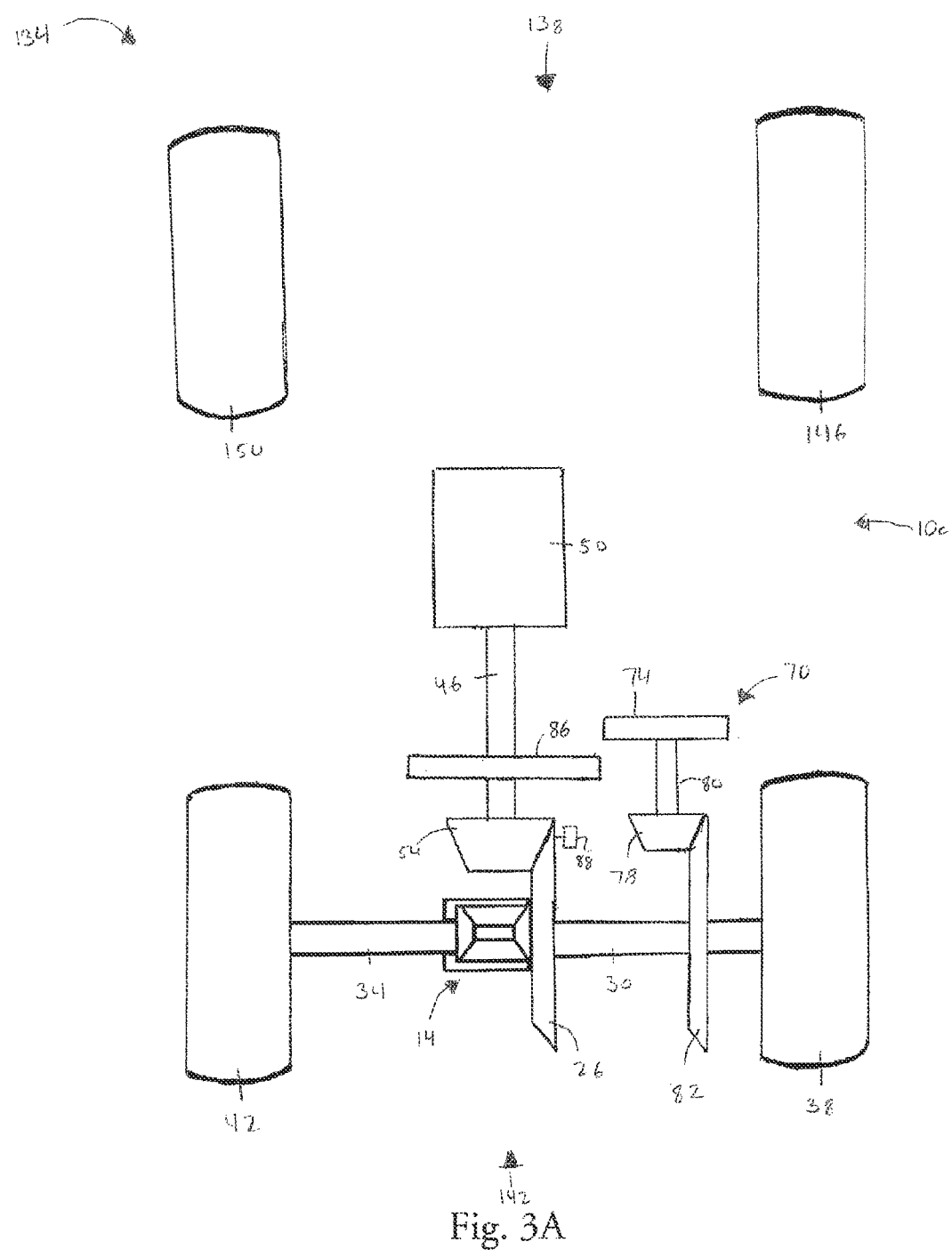
FIGS. 3A-3B depict another embodiment of the present vehicle drive control systems; in this embodiment, a ring and pinion assembly is configured to be coupled to a main drive shaft such that power from the main drive shaft can be directed through a half shaft to a drivable wheel.
Figure 3B:
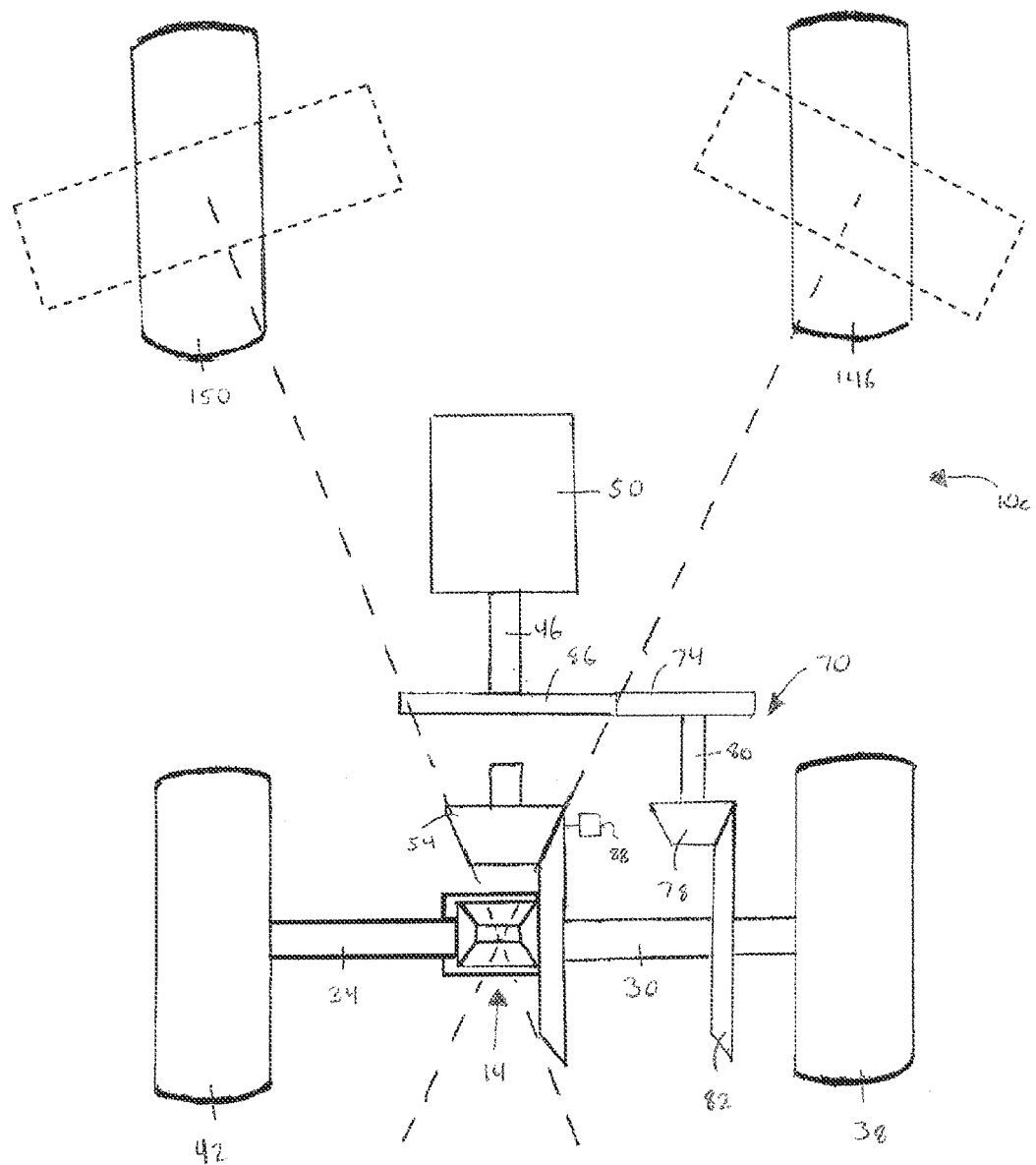

In vehicle drive control system 10c shown in FIGS. 3A and 3B, the system includes a first ring and pinion assembly 70 couplable to half shaft 30. Ring and pinion assembly 70 comprises first horizontal ring gear 74 coupled to first pinion gear 78 through shaft 80. Assembly 70 also includes first half shaft gear 82 that is coupled to and coaxial with half shaft 30 such that half shaft gear 82 can rotate half shaft 30. Assembly 70 should be configured such that it does not inhibit the rotation of half shaft 30 and/or drivable wheel 38 when drive unit 50 is driving drivable wheels 42 and/or 38 during normal operation of the vehicle. Such a configuration can be achieved in any suitable manner, as those of ordinary skill in the art will understand.

In the embodiment shown, ring and pinion assembly 70 is also couplable to main drive shaft 46. Specifically, in the embodiment shown, system 10*c* is configured such that gear 86, which is coupled to and coaxial with main drive shaft 46, can be decoupled from pinion 54 and coupled to horizontal ring gear 74 of ring and pinion assembly 70. When gear 86 is coupled to assembly 70 instead of pinion 54, power from main drive shaft 46 can be directed to drive drivable wheel 38 (e.g., through ring and pinion assembly 70). System 10*c* could be configured to advance and retract main drive shaft 46 and/or gear 86, such as by using a shift collar (or in any other manner similar to how gear shifting occurs in a mechanical transmission), and the movement could be initiated electronically, mechanically, or in any other suitable fashion.

Some embodiments of the present vehicle drive control systems (e.g., system 10*c*) include a rotation-prevention mechanism configured to lock differential gear assembly 14, such as by preventing rotation of ring gear 26 when main drive shaft 46 is coupled to ring and pinion assembly 70 such that power from main drive shaft 46 can drive drivable wheel 38. In some such embodiments, the rotation-prevention mechanism can take the form of the structures involved in putting drive unit 50 (and, correspondingly, main drive shaft 46) in park. In other embodiments, the rotation-prevent mechanism may take the form of a brake for main drive shaft 46 that is tied, for example, to either the housing of drive unit 50 or the chassis (not shown) of the vehicle. In other embodiments, rotation-prevention mechanism may take the form of mechanism 88, which can be configured to act directly on and prevent the rotation of ring gear 26 (as shown) or to act directly on and prevent the rotation of pinion 54 (not shown), such as with a locking pin, cog, or pawl. In other words, at least one of ring gear 26, pinion 54, half shaft 30, and differential gear assembly 14 comprises or may be coupled to a mechanism to prevent rotation of (e.g., by locking) ring gear 26 (either directly or indirectly) when main drive shaft 46 is coupled to ring and pinion assembly 70 such that power from main drive shaft 46 may be directed through (e.g., back drive) differential gear assembly 14 to power drivable wheel 42 in an opposite rotational direction than drivable wheel 38.

Figure 4A:
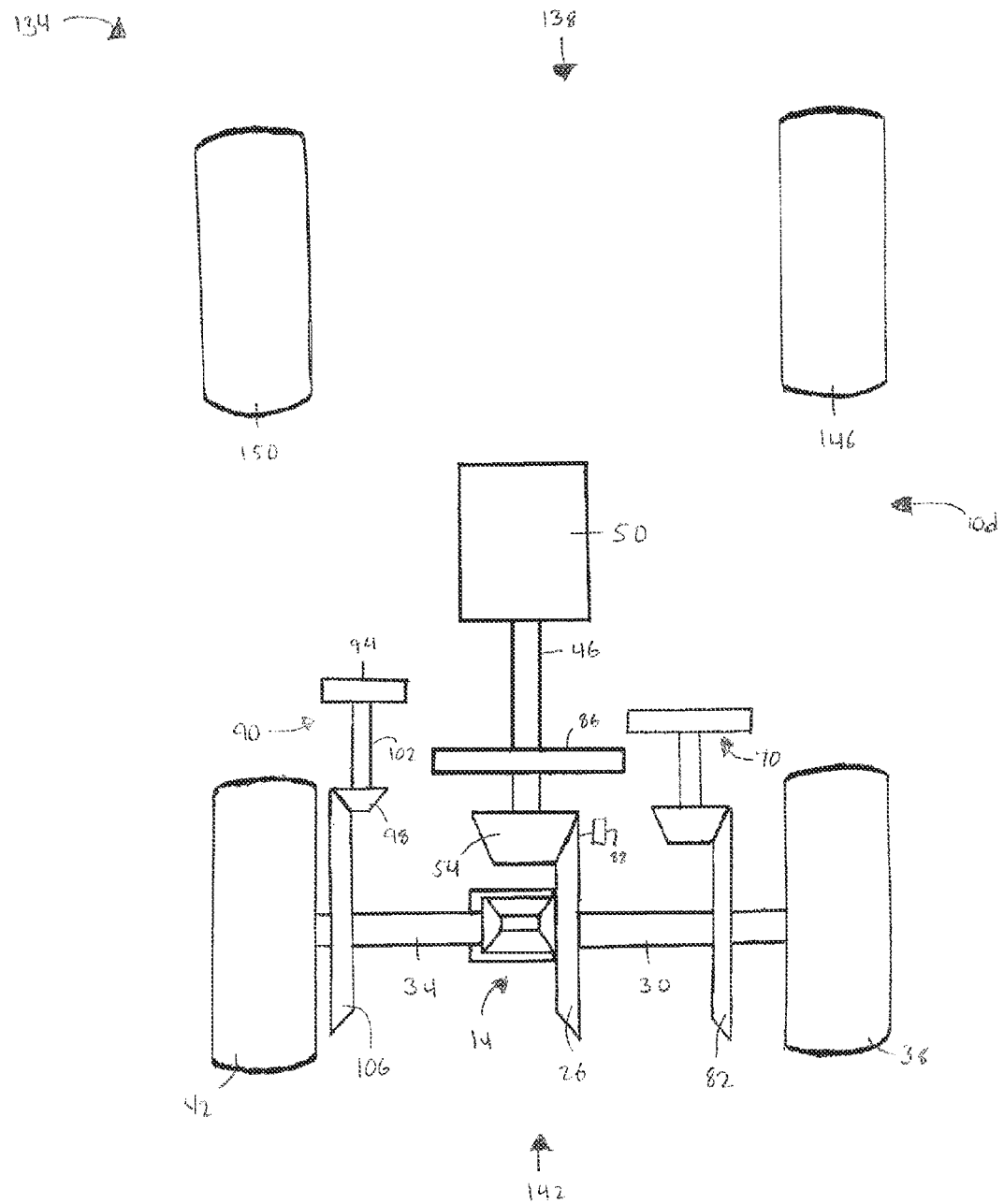
FIGS. 4A-4B depict another embodiment of the present vehicle drive control systems; in this embodiment, first and second ring and pinion assemblies are configured to be coupled to a main drive shaft such that power from the main drive shaft can be directed to one or both drivable wheels through one or both half shafts.
Figure 4B:
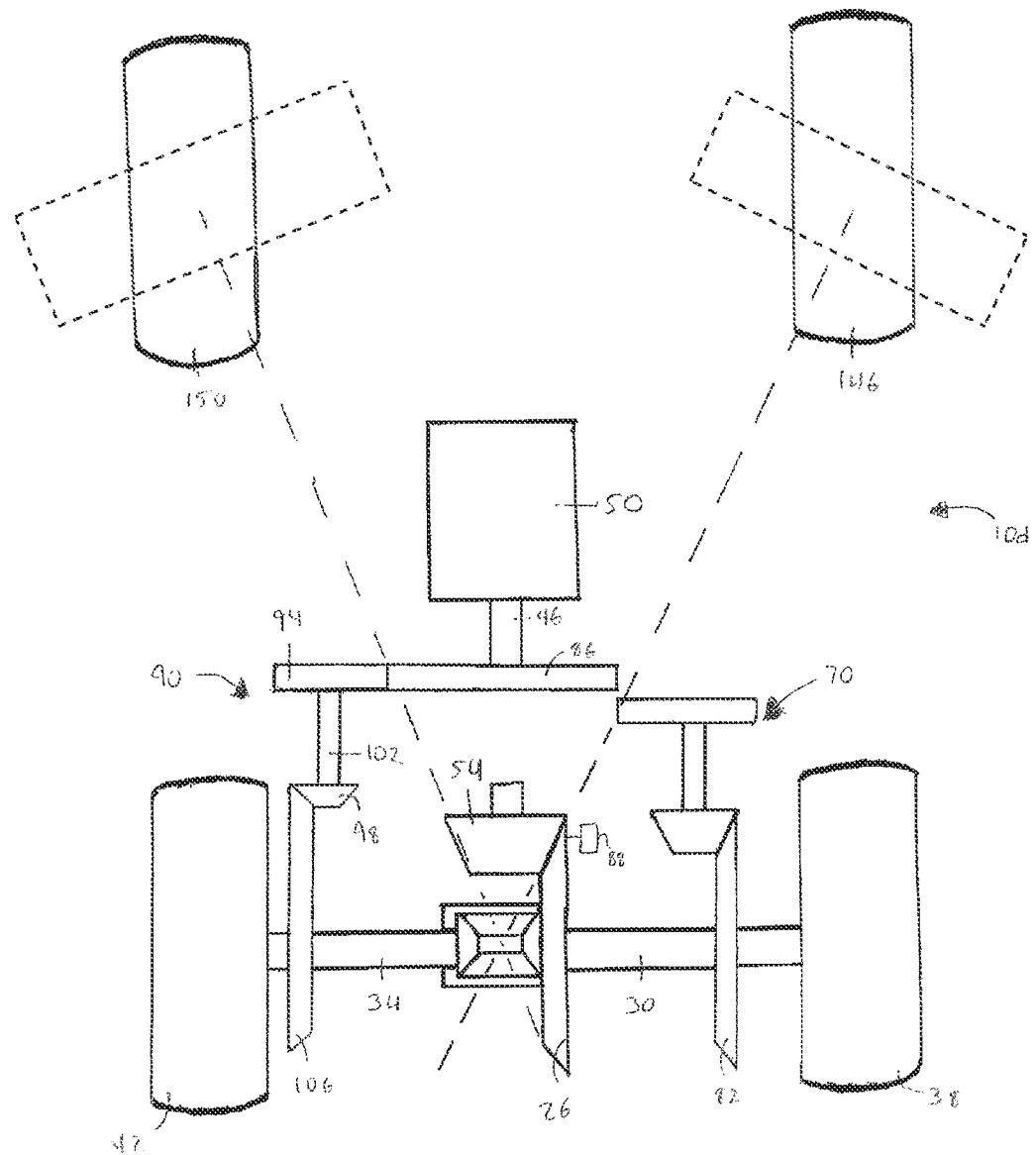

FIGS. 4A-4B depict another embodiment of the present vehicle drive control systems, system 10*d*, in which the system includes a second ring and pinion assembly 90 that is couplable (e.g., coupled, in the depicted embodiment) to half shaft 34. In the embodiment shown, ring and pinion assembly 90 comprises second horizontal ring gear 94 coupled to second pinion gear 98 through shaft 102. Assembly 90 also includes second half shaft gear 106 that is coupled to and coaxial with half shaft 34 such that half shaft gear 106 can rotate half shaft 34.

In the embodiment shown, ring and pinion assembly 90 is also couplable to main drive shaft 46. Specifically, system 10*d* is configured such that gear 86, which is coupled to and coaxial with main drive shaft 46, can be decoupled from pinion 54 and coupled to horizontal ring gear 94 of ring and pinion assembly 90, as, for example, described above with respect to assembly 70. When gear 86 is coupled to assembly 90 instead of pinion 54, power from main drive shaft 46 can be directed to drive drivable wheel 42, e.g., through ring and pinion assembly 90. In such embodiments, any suitable mechanism may be used to lock differential gear assembly 14 such that power from main drive shaft 46 may be directed through (e.g., back drive) differential gear assembly 14 to power drivable wheel 38 in an opposite rotational direction than drivable wheel 42.

Figure 5A:
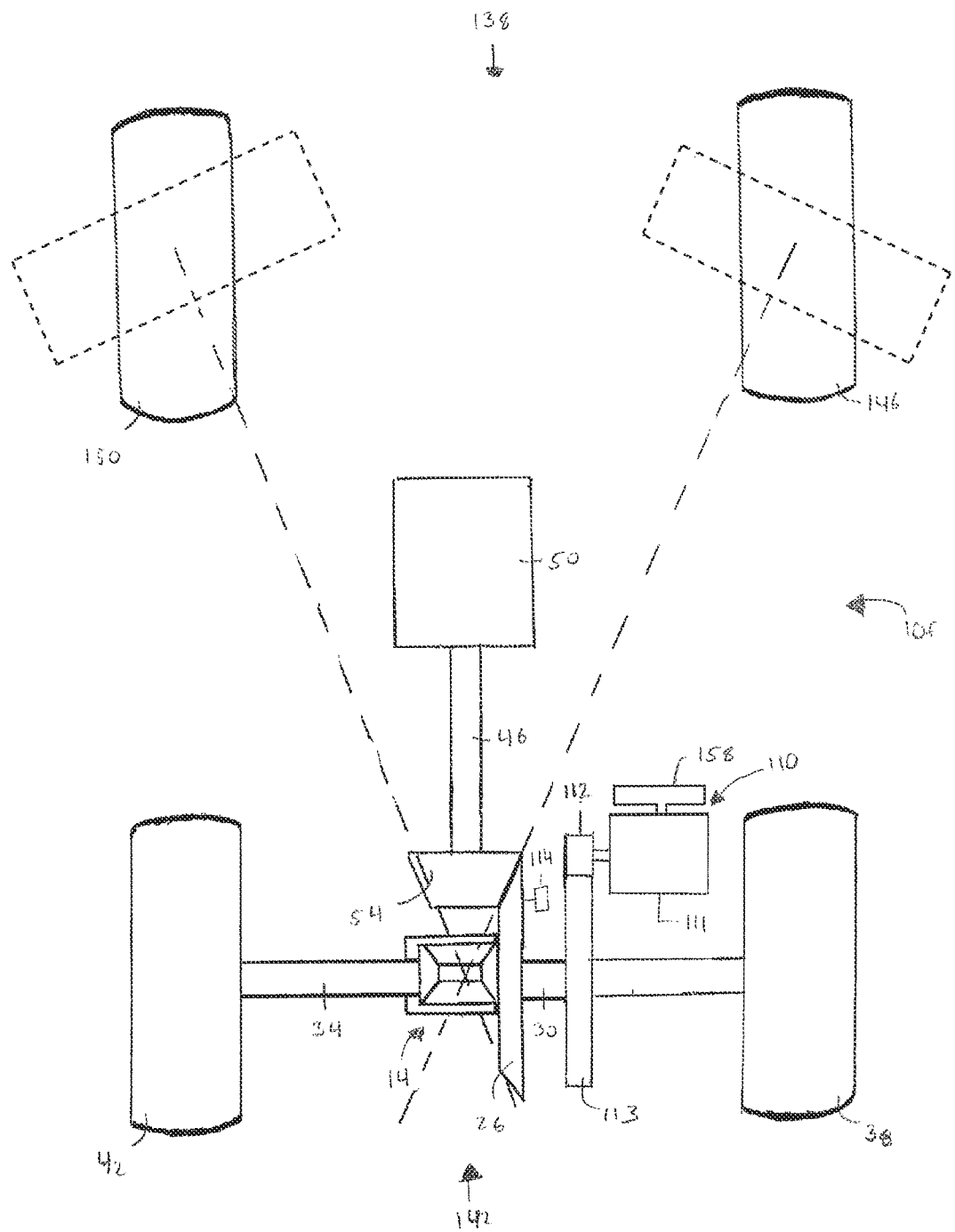
FIG. 5A depicts another embodiment of the present vehicle drive control systems; in this embodiment, at least one drivable wheel can be driven by a supplemental drive. In another embodiment, this configuration can be applied to a front drivable wheel.
Figure 5B:
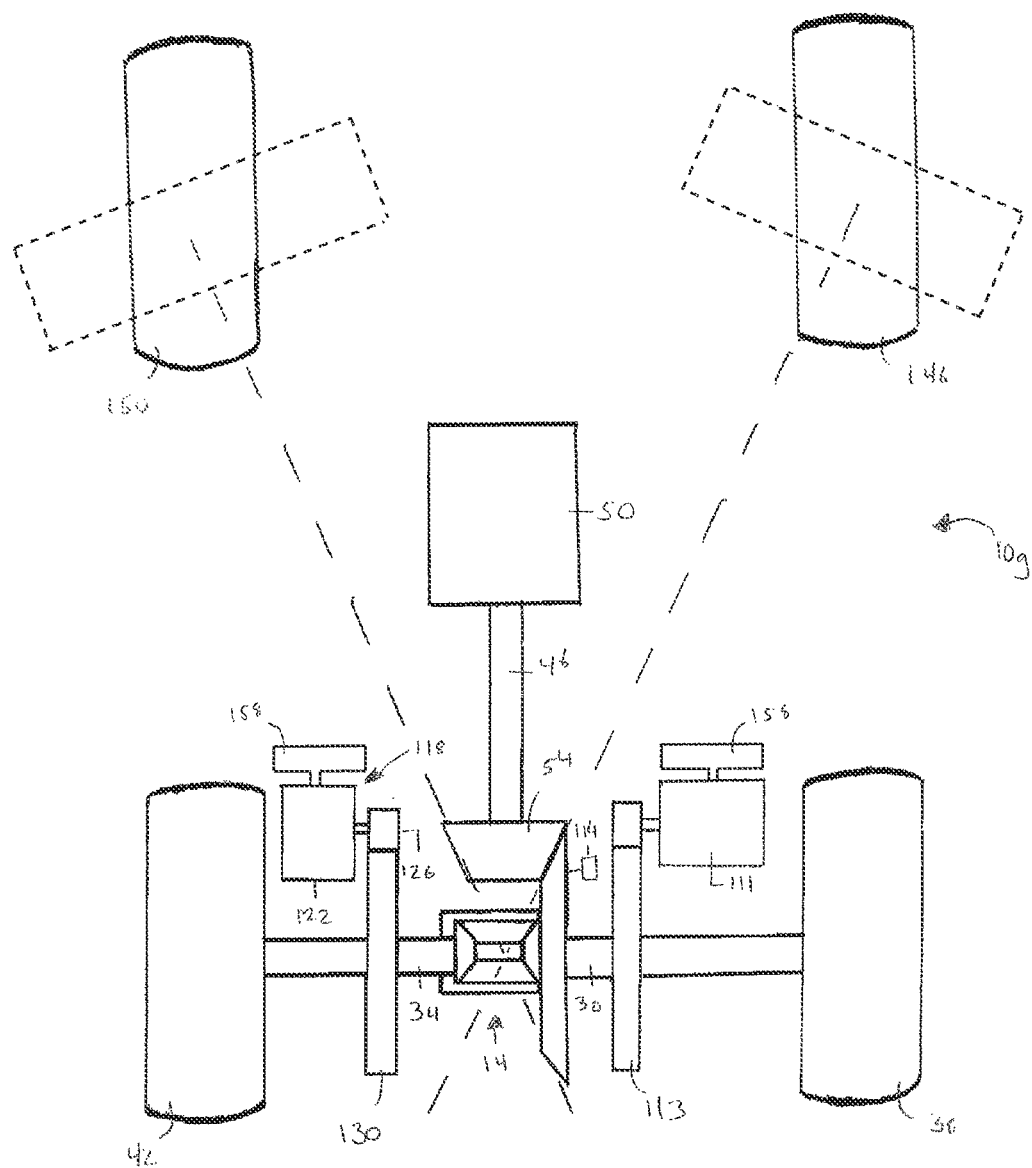
FIG. 5B depicts another embodiment of the present vehicle drive control systems; in this embodiment, one or both drivable wheels can each be driven by one or more respective supplemental drives.

Some embodiments of the present vehicle drive control systems, such as system 10*f* in FIGS. 5A-5B, include a first supplemental drive unit 110 that is configured to be coupled (e.g., is coupled, in the depicted embodiment) to half shaft 30. Supplemental drive unit 110 includes drive 111 that may comprise, for example, a combustion engine, a steam engine, a reciprocating engine, a gas turbine, a hydraulic engine, an electrical engine, a battery, an electric wheel motor, a pneumatic actuator, a linear actuator, a piezoelectric actuator, and/or the like. Unit 110 also includes drive gear 112, which is coupled to drive 111. Drive gear 112 may engage first shaft gear 113 that is coupled to and coaxial with half shaft 30 such that the rotation of drive gear 112 by drive 111 of supplemental drive unit 110 can rotate half shaft 30.

In some such embodiments, at least one of ring gear 26, pinion 54, half shaft 30, and differential gear assembly 14 comprises or is coupled to a mechanism to prevent rotation (e.g., by locking) of ring gear 26, such as by placing drive unit 50 in park. For example, the system may include rotation-prevention mechanism 114, which can be configured as rotation-prevention mechanism 88, described above, to prevent rotation of ring gear 26 such that power from supplemental drive unit 110 can power drivable wheel 38 (e.g., through shaft gear 113 and half shaft 30) and back drive differential assembly 14 such that drivable wheel 42 rotates in an opposite direction than drivable wheel 38.

Some embodiments of the present vehicle drive control systems, such as system 10*g* in FIG. 5B, include a second supplemental drive unit 118 that is configured to be coupled (e.g., is coupled, in the depicted embodiment) to half shaft 34. Supplemental drive unit 118 includes drive 122 that may comprise, for example, a combustion engine, a steam engine, a reciprocating engine, a gas turbine, a hydraulic engine, an electrical engine, a battery, an electric wheel motor, a pneumatic actuator, a linear actuator, a piezoelectric actuator, and/or the like. Unit 118 also includes drive gear 126, which is coupled to drive 122. Drive gear 126 may engage second shaft gear 130 that is coupled to and coaxial with half shaft 34 such that rotation of drive gear 126 by drive 122 of supplemental drive unit 118 can rotate half shaft 34. In such embodiments, any suitable mechanism (e.g., rotation-prevention mechanism 114) may be used to lock differential gear assembly 14 such that power from supplemental drive unit 118 can power drivable wheel 42 (e.g., through shaft gear 130 and half shaft 34) and back drive differential assembly 14 such that drivable wheel 38 rotates in an opposite direction than drivable wheel 42. Other embodiments of the present vehicle drive control systems may comprise more than two supplemental drive units.

Figure 4C:
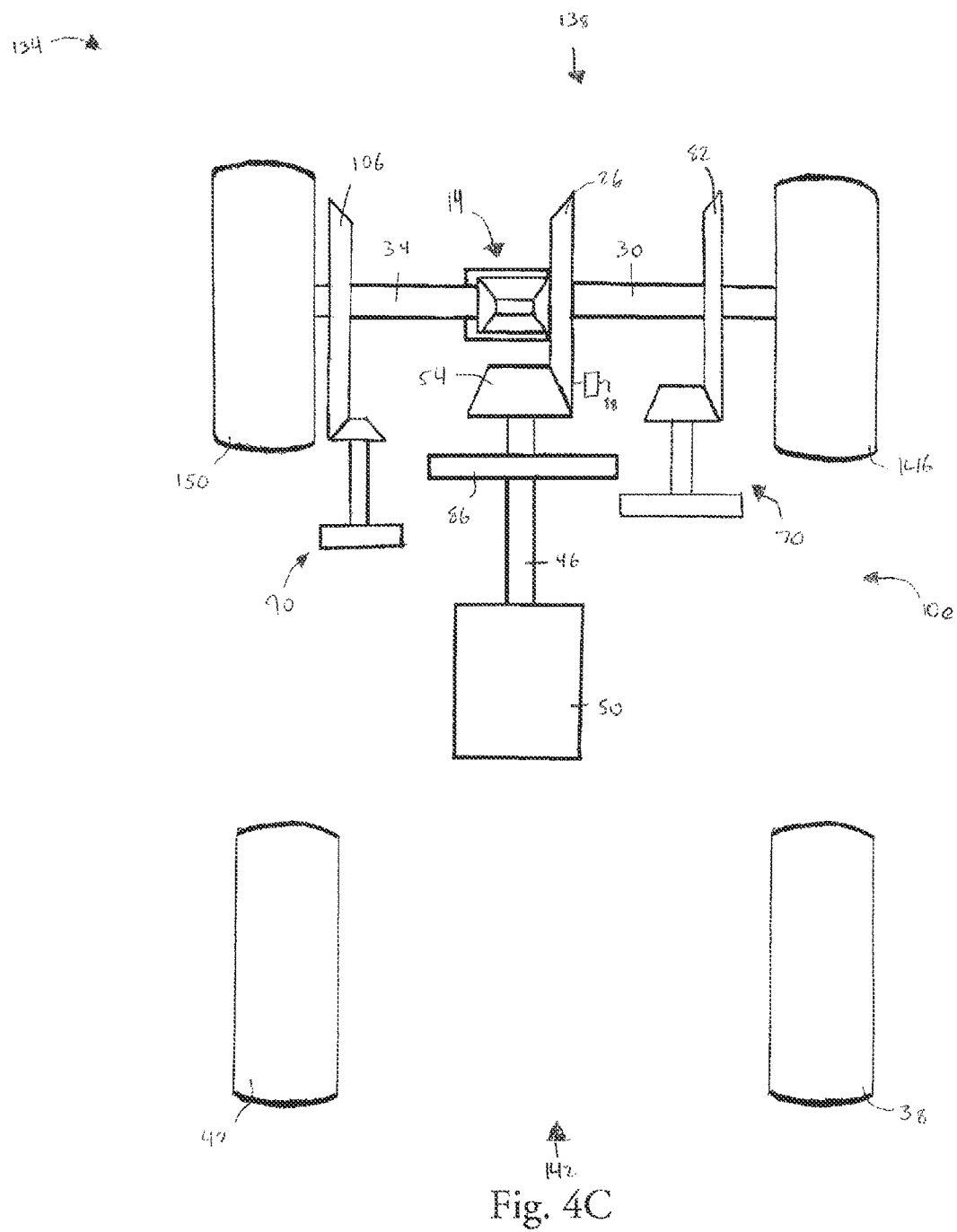
FIGS. 4C-4D depict another embodiment of the present vehicle drive control systems that is similar to the system shown in FIGS. 4A-4B except that the first and second drivable wheels are front first and front second drivable wheels.
Figure 4D:
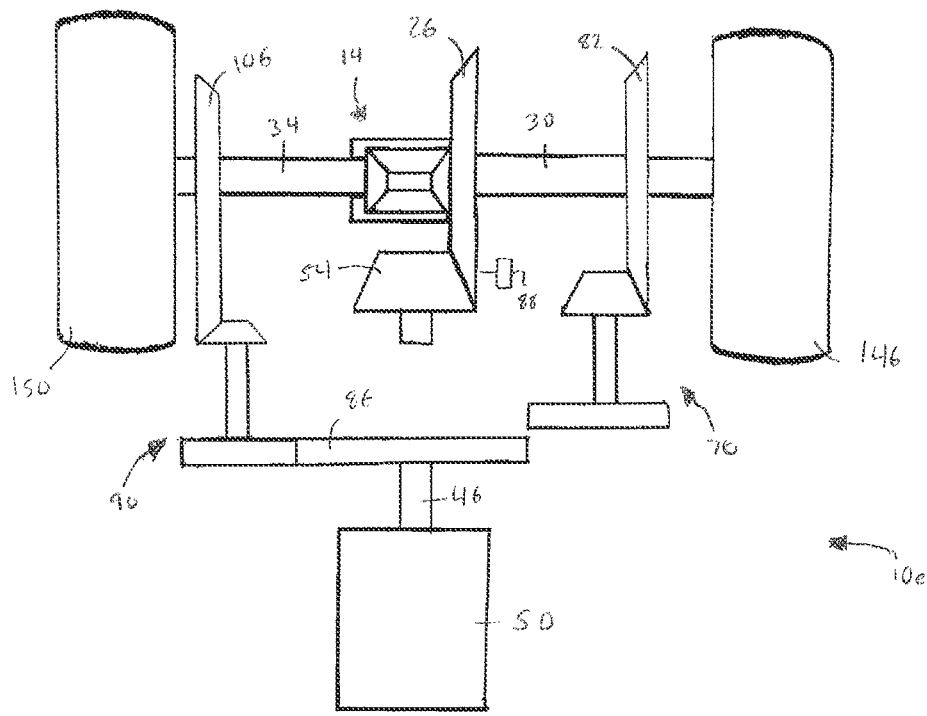
Figure 4D:
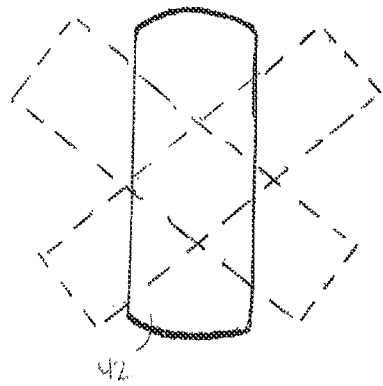
Figure 4D:
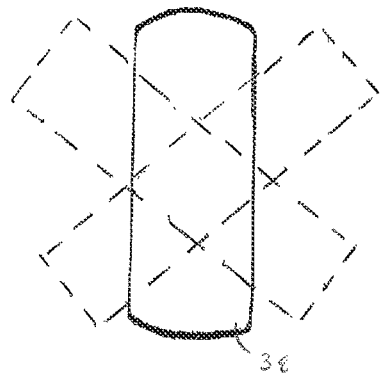
Figure 5C:
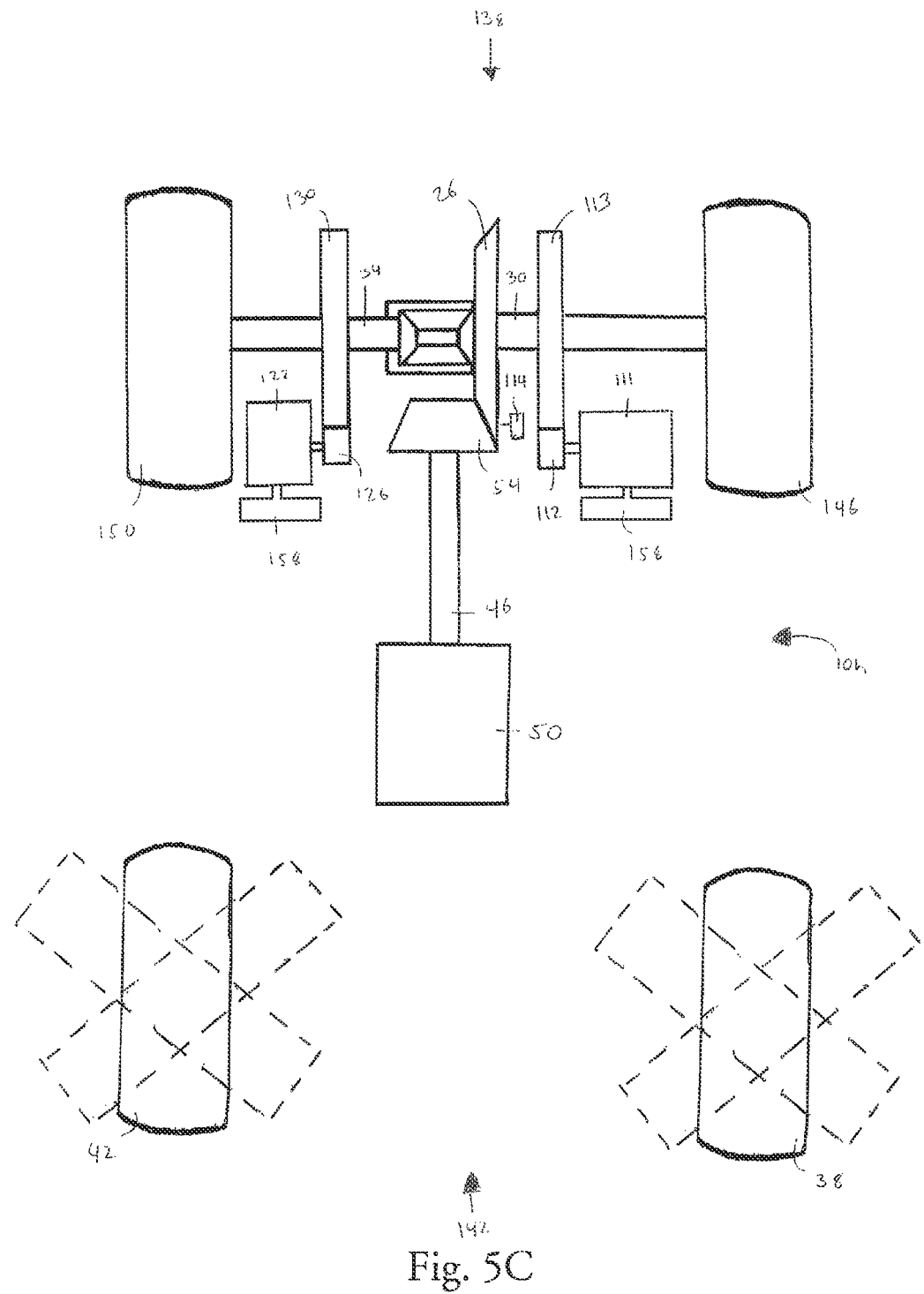
FIG. 5C depicts another embodiment of the present vehicle drive control systems that is similar to the system shown in FIG. 5B except that the drivable wheels are front wheels.

As shown throughout the figures, embodiments of the present vehicle drive systems may be part of a vehicle 134 having a front end 138, a rear end 142, and one or more additional wheels, such as wheels 146 and 150. As depicted in the figures, a portion or all of a given one of the present vehicle drive systems can be positioned near rear end 142 of vehicle 134 (e.g., systems 10 (FIGS. 1A and 1B), 10*a* (FIGS. 2A and 2B), 10*c* (FIGS. 3A and 3B), 10*d* (FIGS. 4A and 4B), 10*f* (FIG. 5A), and 10*g* (FIG. 5B)) such that main drive shaft 46 acts on (e.g., indirectly) drivable wheels 38 and 42. Further, as depicted in systems 10*b* (FIGS. 2C and 2D), 10*e* (FIGS. 4C and 4D), and 10*h* (FIG. 5C), a portion or all of a given one of the present vehicle drive systems may be positioned near front end 138 of vehicle 134 such that main drive shaft 46 acts (e.g., indirectly) on drivable wheels 146 and 150. Furthermore, in the vehicle in which system 10b from FIGS. 2C and 2D may be used, a low- to zero-radius turn may be effected using system 10b to drive front drivable wheels 150 and 146 while allowing rear wheels 42 and 38 to rotate freely (about both X and Y axes), like caster wheels. The same is true of system 10e shown in FIGS. 4C and 4D. As the figures show, at least one or more of the wheels of the example vehicles are steerable, as indicated by the dashed lines in, for example, FIGS. 1A and 1B, which represent wheels 150 and 146 in different turned positions. The converging dashed lines extending from the dashed lines representing the steered wheels illustrate how vehicles with the present vehicle device control systems may be used to make a low-radius (e.g., zero-radius) turn. Furthermore, as the figures show, at least one or more of the wheels of the example vehicles are drivable, such as rear drivable wheels 42 and 38 in FIGS. 1A and 1B, and all four wheels in FIGS. 2A and 2B. In some of the vehicles, some of the wheels are both steerable and drivable, such as front wheels 146 and 150 in FIGS. 2A and 2B. Furthermore, some embodiments of the present vehicle drive control systems are configured to move one or more of the drivable wheels of a given vehicle independently of one or more of the drivable wheels; for example, vehicle drive control system 10a in FIGS. 2A and 2B is configured to move rear drivable wheel 38 independently of rear drivable wheel 42 and independently of both front drivable wheel 150 and front drivable wheel 146.

Figure 2A:
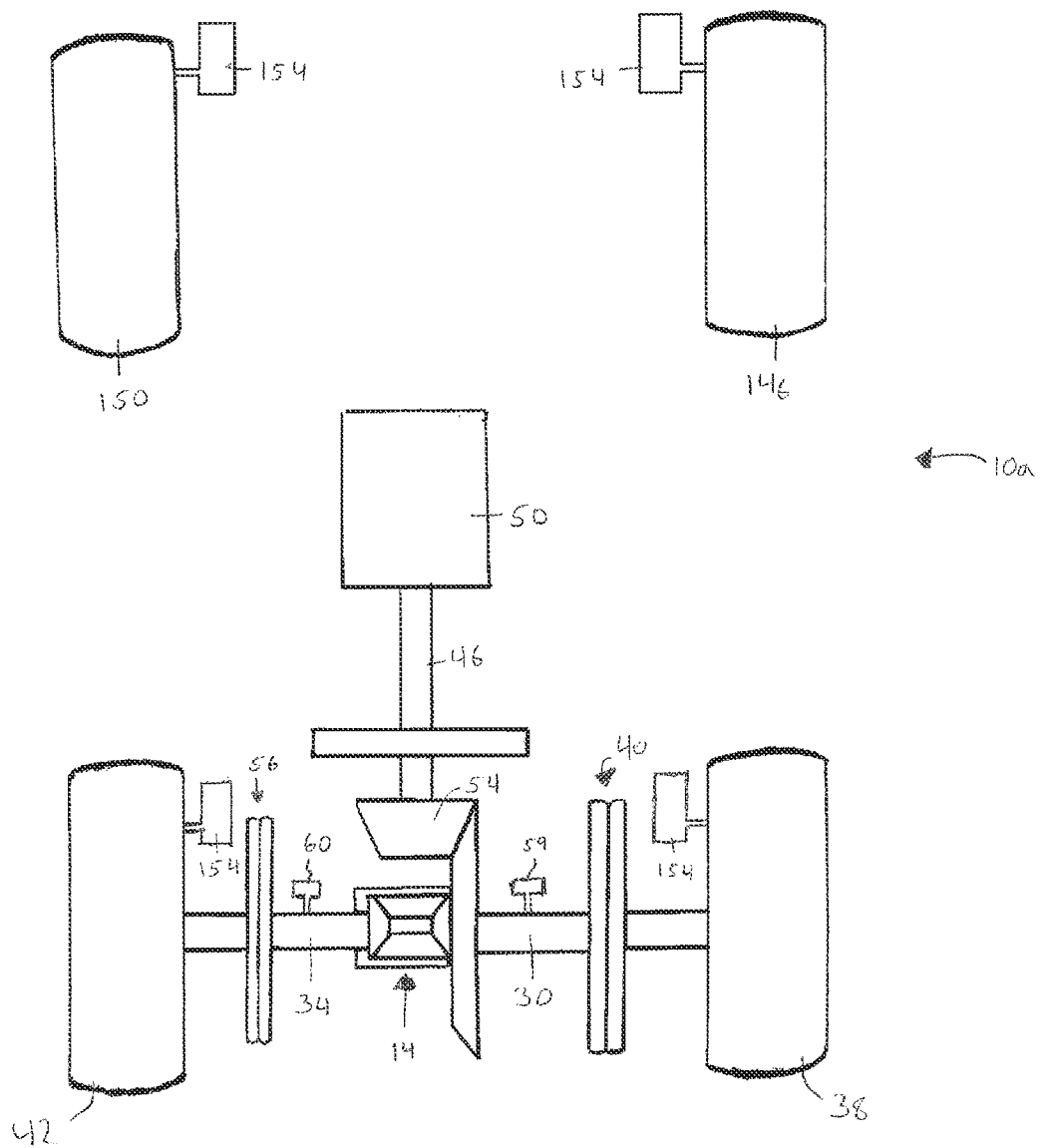
FIGS. 2A-2B depict another embodiment of the present vehicle drive control systems in the context of first and second drivable wheels that can be decoupled from their respective half shafts such that one or both drivable wheels can rotate independently of their respective half shafts.
Figure 2B:
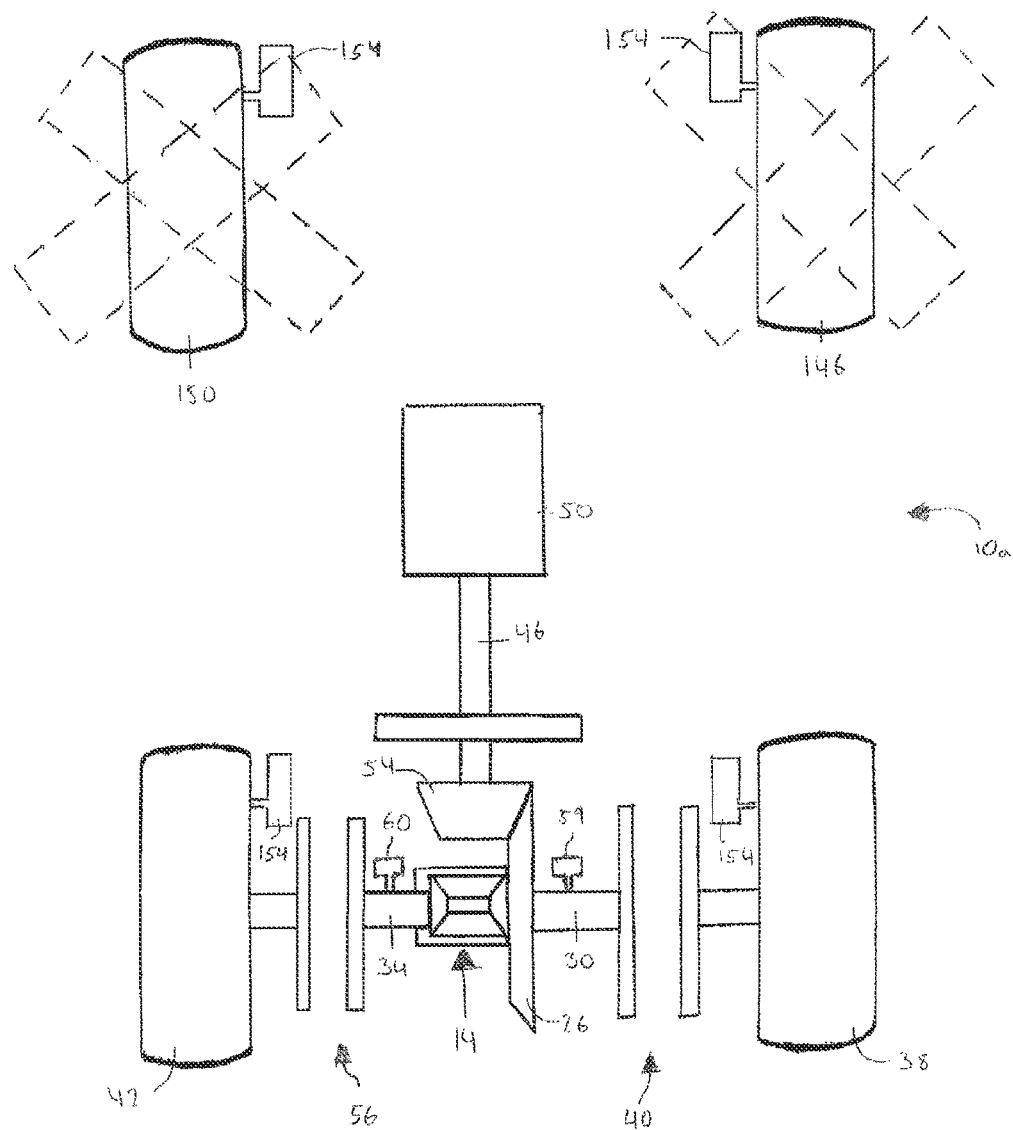
Figure 2C:
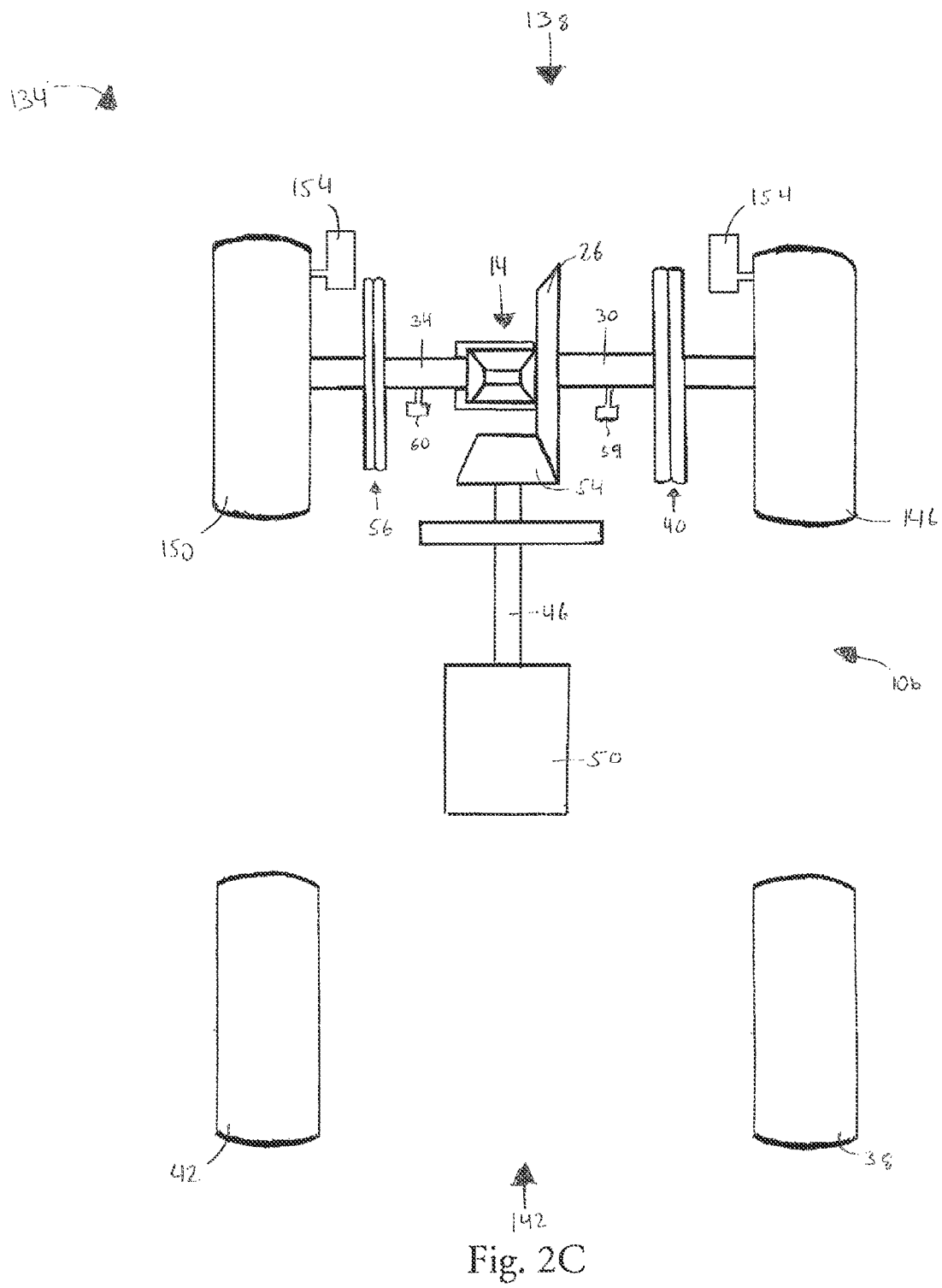
FIGS. 2C-2D depict another embodiment of the present vehicle drive control systems that is similar to the system shown in FIGS. 2A-2B except that the first and second drivable wheels are front first and front second drivable wheels.
Figure 2D:
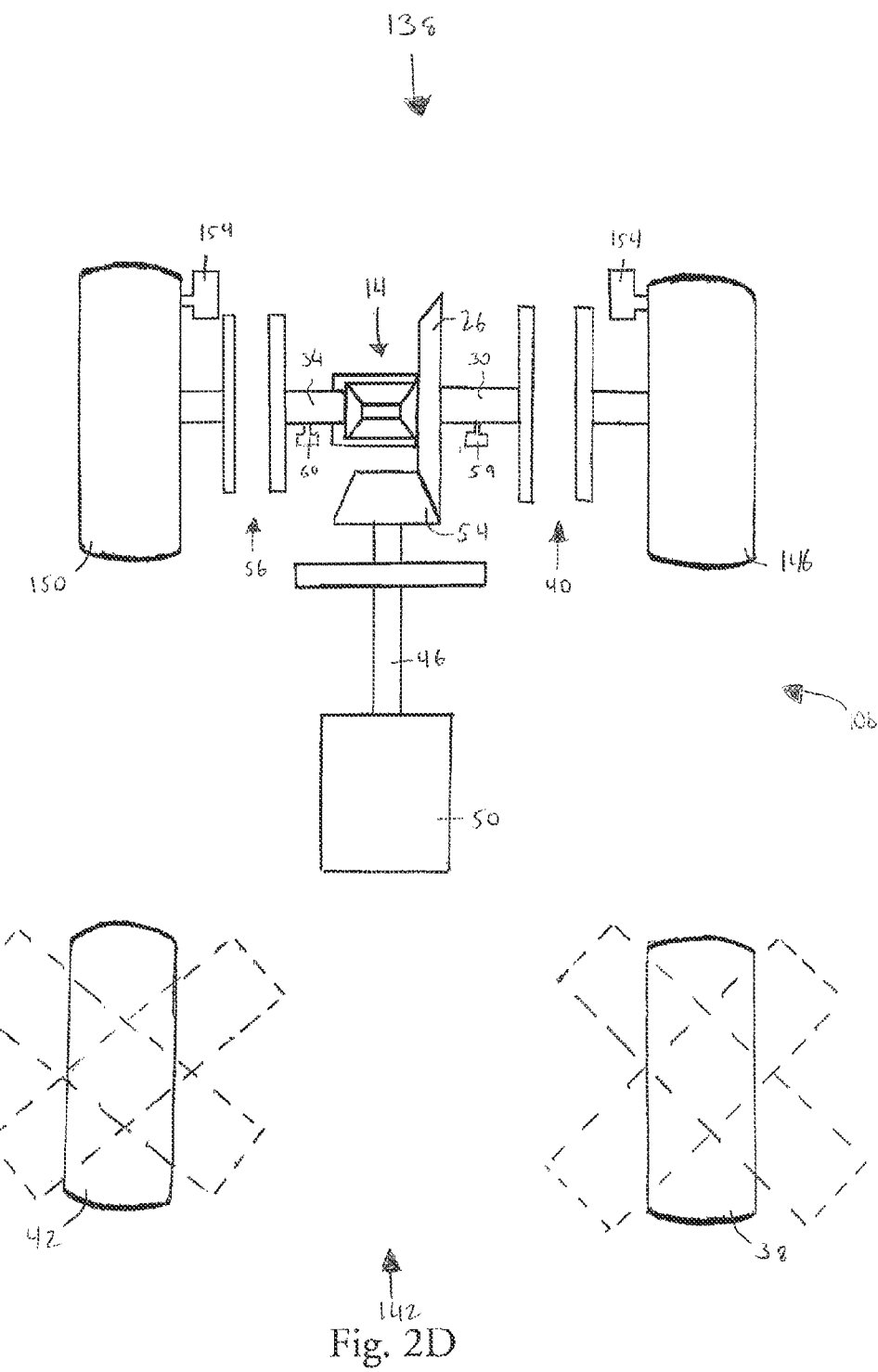

Some embodiments of the present vehicle drive control systems include one or more wheel motors (e.g., electrical wheel motors), each of which is configured to drive a drivable wheel, such as wheel motors 154 of system 10a that are configured to drive front drivable wheels 146 and 150, as shown in FIGS. 2A and 2B. Also, as shown in system 10b depicted in FIGS. 2C and 2D, such wheel motors can be used to drive wheels that are otherwise drivable by the vehicle's main drive unit (e.g., drive unit 50) following the decoupling of those wheels from such a drive unit.

Each such wheel motor may be configured as a regenerative braking wheel motor, such that, under the appropriate triggering condition (e.g., following a signal indicating braking is necessary or desired), the motor may be placed in a reverse mode to help slow down the vehicle. Furthermore, in reverse mode, such a motor acts as a generator, producing electricity that may be stored in any suitable location and later used to power that wheel motor or any other electrically-powered device of the vehicle, such as the motor (if electric) of drive unit 50, the motor (if electric) of supplement drive unit 110, and/or the motor of supplement drive unit 118 of systems 10f and 10g shown in FIGS. 5A and 5B, respectively, or, as another example, any motor used in steering the vehicle.

Some embodiments of the present vehicle drive control systems include an energy recovery system, such as energy recovery system 158 of system 10f shown in FIG. 5A, that can be used to help power another device or devices of the vehicle. For example, in some embodiments, such as system 10f, energy recovery system 158 may be a hydraulic energy recovery system that can be used to help store the vehicle's kinetic energy during braking in a manner that allows it to be applied later to help drive the vehicle, such as by powering one or more of the drives (e.g., a version of drive 111 that is hydraulic). In other embodiments, energy recovery system 158 may be an electric energy recovery system.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, while system 10c shown in FIGS. 3A and 3B can be used to effect a low- to zero-radius turn by driving the rear drivable wheels and steering the front steerable wheels as described above, the front wheels could be configured to rotate freely in such a turning mode (such that they can move like caster wheels) and still achieve the same result. As another example, while half shaft gear 82 and ring and pinion assembly 70 have been illustrated in FIGS. 3A and 3B on the same side of the differential gear assembly as ring gear 26, they can be located on the other side of the differential gear assembly in other embodiments. As another example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A vehicle drive control system for directing power to at least one drivable element, comprising:
   a differential gear assembly coupled to a main drive shaft such that the main drive shaft can drive the differential gear assembly;
   a first half shaft and a second half shaft extending from the differential gear assembly, the first half shaft coupled to a first drivable element and the second half shaft coupled to a second drivable element, the first half shaft being decouplable from the first drivable element such that the first drivable element can rotate independently of the first half shaft; and
   a rotation-prevention mechanism configured to prevent rotation of the first half shaft when the first half shaft is decoupled from the first drivable element such that power from the main drive shaft can be directed through the differential gear assembly to drive the second drivable element without also driving the first half shaft.

2. The vehicle drive control system of claim 1, where the system comprises a pinion coupled to the main drive shaft and to the differential gear assembly.

3. The vehicle drive control system of claim 2, where the pinion is coupled to the differential gear assembly through a ring gear.

4. The vehicle drive control system of claim 1, where the second half shaft is decouplable from the second drivable element such that the second drivable element can rotate independently of the second half shaft.

5. The vehicle drive control system of claim 4, further comprising a second rotation-prevention mechanism configured to prevent rotation of the second half shaft when the second half shaft is decoupled from the second drivable element such that power from the main drive shaft can be directed through the differential gear assembly to drive the first drivable element without also driving the second half shaft.

6. The vehicle drive control system of claim 5, in which the system is part of a vehicle having a front end and a rear end, and the first and second drivable elements are rear first and rear second drivable elements.

7. The vehicle drive control system of claim 5, in which the system is part of a vehicle having a front end and a rear end, and the first and second drivable elements are front first and front second drivable elements.

8. The vehicle drive control system of claim 7, where the front first drivable element is coupled to and can be driven by at least one wheel motor.

9. The vehicle drive control system of claim 8, where the at least one wheel motor is configured as a regenerative braking wheel motor.

10. The vehicle drive control system of claim 7, where the front second drivable element is coupled to and can be driven by at least one wheel motor.

11. The vehicle drive control system of claim 10, where the at least one wheel motor is configured as a regenerative braking wheel motor.

12. The vehicle drive control system of claim 6, where the rear first drivable element is coupled to and can be driven by at least one wheel motor.

13. A vehicle drive control system for directing power to at least one drivable element, comprising:
a differential gear assembly couplable to a main drive shaft such that the main drive shaft can drive the differential gear assembly;
a first half shaft and a second half shaft extending from the differential gear assembly, the first half shaft coupled to a first drivable element and the second half shaft coupled to a second drivable element, the differential gear assembly including a ring gear rotatably coupled to the first half shaft; and
a first ring and pinion assembly coupled to the first half shaft, the first ring and pinion assembly couplable to the main drive shaft such that power from the main drive shaft can be directed through the first ring and pinion assembly to the first half shaft;
where the differential gear assembly is lockable such that, when the differential gear assembly is locked and the main drive shaft is coupled to the first ring and pinion assembly, power from the main drive shaft can drive the first drivable element in a first direction and back drive the differential gear assembly to cause the second drivable element to rotate in a second direction opposite to the first direction.

14. The vehicle drive control system of claim 13, where the system comprises a pinion coupled to the main drive shaft.

15. The vehicle drive control system of claim 13, where the pinion is couplable to the differential gear assembly through a ring gear.

16. The vehicle drive control system of claim 15, further comprising:
a second ring and pinion assembly coupled to the second half shaft, the second ring and pinion assembly couplable to the main drive shaft such that power from the main drive shaft can be directed through the second ring and pinion assembly to the second half shaft.

17. A vehicle drive control system for directing power to at least one drivable element, comprising:
a differential gear assembly coupled to a main drive shaft such that the main drive shaft can drive the differential gear assembly;
a first half shaft and a second half shaft extending from the differential gear assembly, the first half shaft coupled to a first drivable element and the second half shaft coupled to a second drivable element, the differential gear assembly including a ring gear rotatably coupled to the first half shaft; and
a first supplemental drive unit coupled to the first half shaft;
where the differential gear assembly is lockable such that, when the differential gear assembly is locked, power from the first supplemental drive can drive the first drivable element in a first direction and back drive the differential gear assembly to cause the second drivable element to rotate in a second direction opposite to the first direction.

18. The vehicle drive control system of claim 17, where the system comprises a pinion coupled to the main drive shaft.

19. The vehicle drive control system of claim 18, where the pinion is coupled to the differential gear assembly through a ring gear.

20. The vehicle drive control system of claim 19, further comprising:
a second supplemental drive unit coupled to the second half shaft such that power from the second supplemental drive can drive the second drivable element and, when the differential gear assembly is locked, back drive the differential gear assembly to rotate the first drivable element in a direction opposite to a direction of the second drivable element.

* * * * *